INVENTORS
THOMAS STEEL
JAMES ALEXANDER PETRIE
ALFRED JOHN HONEY

By
Cushman, Darby & Cushman
Attorneys

United States Patent Office 3,438,400
Patented Apr. 15, 1969

3,438,400
JET PIPES
Thomas Steel, James Alexander Petrie, and Alfred John Honey, Derby, England, assignors to Rolls-Royce Limited, Derby, Derbyshire, England, a British company
Filed Feb. 6, 1967, Ser. No. 614,195
Claims priority, application Great Britain, Feb. 26, 1966, 8,535/66
Int. Cl. F15d 1/08
U.S. Cl. 138—40          8 Claims

ABSTRACT OF THE DISCLOSURE

An articulated jet pipe having rotatable positions for varying the direction of jet efflux. Adjacent portions have end faces inclined to their respective axes and are rotated via ring gears and epicyclic gearing. Rollers running in tracks prevent rotation of the planet carriers of the epicyclic gears, by connecting them to a fixed portion of the jet pipe.

---

This invention concerns improvements relating to jet pipes.

According to the present invention, there is provided a jet pipe having a fixed portion and at least first and second rotatable portions which are mounted successively downstream of each other, the inlet and outlet faces of each rotatable portion being mutually inclined, adjacent end faces of adjacent rotatable portions being respectively provided with annulus gears, a planet carrier for each pair of adjacent rotatable portions, said planet carrier being provided with planet gears which mesh with the respective annulus gears, track and roller means which interconnect the fixed portion of the jet pipe and the or each planet carrier to prevent rotation of the latter, and means for effecting rotation of the most upstream rotatable portion, such rotation permitting the various rotatable portions to be moved between a first position in which the axis of discharge of the most downstream rotatable portion is approximately aligned with that of the fixed portion and a second position in which the said axis is inclined by a substantial angle to that of the fixed portion.

The rotatable portions may have straight axes, the adjacent end faces of adjacent rotatable portions being inclined to the axes of the latter, the said axes being successively inclined by increasing angles to the axis of the fixed portion when the rotatable portions are in the said second position.

Preferably the or each planet carrier is provided with at least one roller which is engageable in the track of a track member which is connected, directly or indirectly, to the fixed portion of the jet pipe so as to be restrained thereby from rotating.

Thus, there may be three rotatable portions which are mounted successively downstream of each other and the second rotatable portion of which is rotatably mounted within a ring, the ring being secured to a track member within which is mounted a roller carried by the planet carrier of the second and third rotatable portions, and the ring having a connection to the fixed portion of the jet pipe which restrains it from rotation.

The ring may have an arm which is provided with a roller, the roller being mounted in a track in a track member which is secured to the fixed portion of the jet pipe.

The said track in the last-mentioned track member may permit radial and/or axial movement of the said arm.

The last-mentioned track member may, moreover, have another track in which is mounted a roller carried by the planet carrier of the first and second rotatable portions.

The invention also comprises a jet engine provided with a jet pipe as set forth above.

Figure 1:
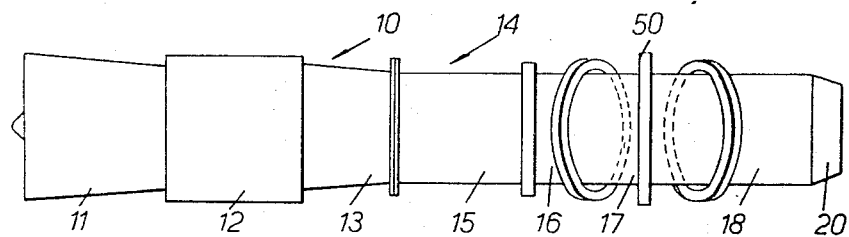
Figure 2:
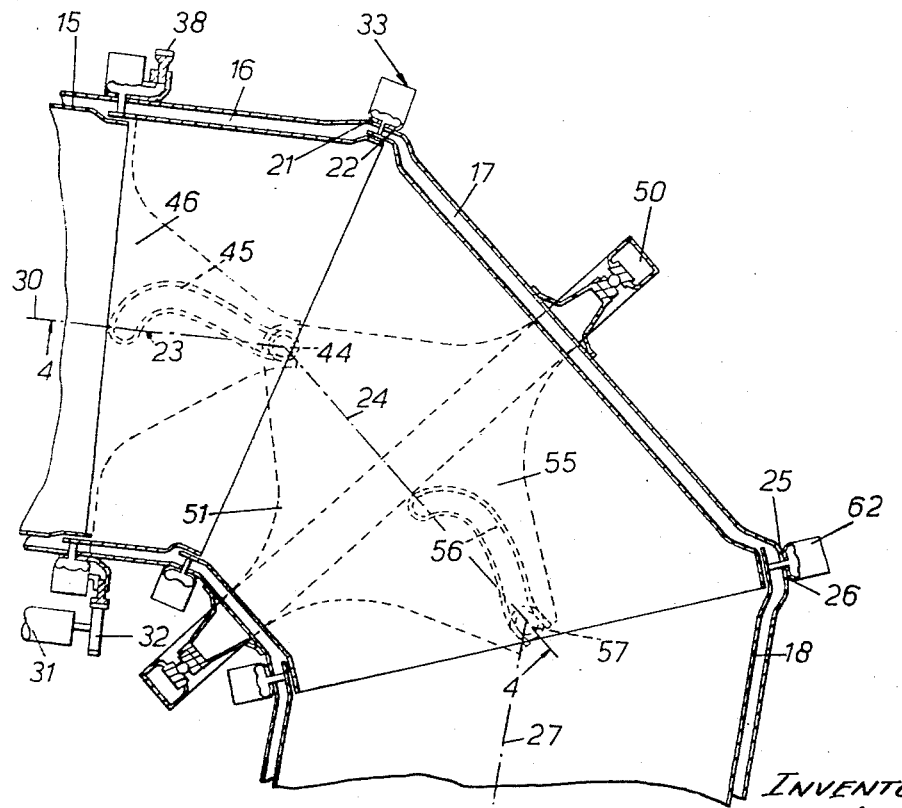
Figure 3:
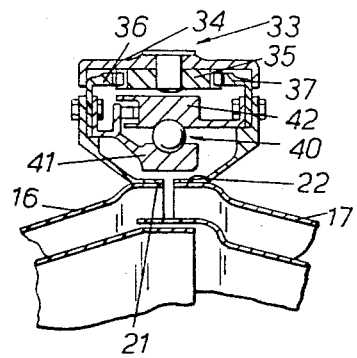
Figure 4:
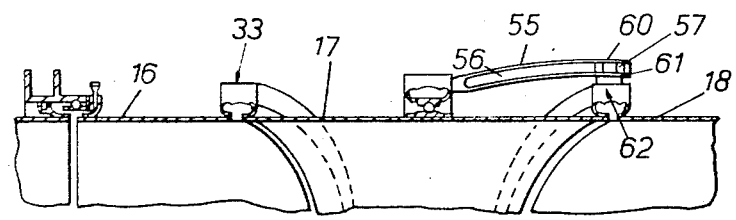
Figure 4:
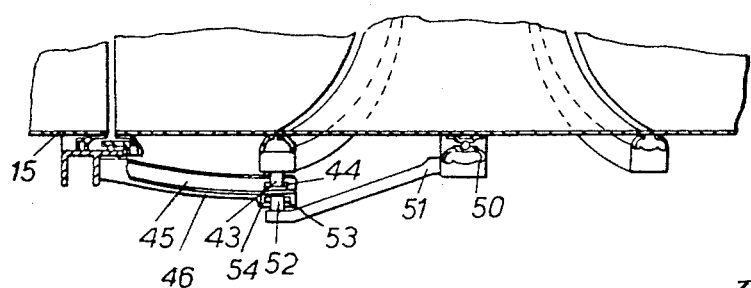

The invention is illustrated, merely by way of example, in the accompanying drawings, in which:

FIGURE 1 is a diagrammatic view of a gas turbine jet engine provided with a jet pipe in accordance with the present invention, FIGURE 2 is a sectional view illustrating part of the structure shown in FIGURE 1 on a larger scale, and with its parts in a different position, FIGURE 3 is a broken-away sectional view illustrating part of the structure shown in FIGURE 2 on a yet larger scale, and FIGURE 4 is a diagrammatic broken-away sectional view taken on the line 4—4 of FIGURE 2.

Referring to the drawings, a gas turbine jet engine 10 has one or more compressors 11, combustion equipment 12, and one or more turbines 13, the turbine exhaust gases being directed to atmosphere through a jet pipe 14.

The jet pipe 14 has a fixed portion 15 and rotatable portions 16, 17, 18, the portions 15 to 18 being arranged successively downstream of each other and each of these portions being double skinned. The rotatable portion 18 is provided with a final nozzle 20.

Adjacent end faces 21, 22 of the rotatable portions 16, 17 respectively are inclined to the respective axes 23, 24 of the said portions. Similarly adjacent end faces 25, 26 of the adjacent rotatable portions 17, 18 are inclined to the respective axes 24, 27 of the rotatable portions 17, 18. Accordingly, it will be appreciated that if the adjacent end faces 21, 22 are maintained adjacent to each other but are relatively rotated, and if the adjacent end faces 24, 27 are maintained adjacent to each other but relatively rotated, the rotatable portions 16–18 may be moved between the forward propulsion position shown in FIGURE 1, in which their axes 23, 24, 27 are approximately aligned with the axis 30 of the fixed portion 15, and the vertical lift position shown in FIGURE 2, in which the axes 23, 24, 27 are successively inclined by increasing angles to the axis 30 of the fixed portion 15.

A motor 31 which is carried (by means not shown) from the fixed portion 15 drives a spur gear 32 which meshes with an annulus gear 38 carried by the upstream end of the rotatable portion 16.

Rotation of the rotatable portion 16 in one angular sense is transmitted via an epicyclic gear device 33 to the rotatable portion 17 to effect rotation of the latter in the opposite angular sense.

The epicyclic gear device 33 comprises a planet carrier 34 (FIGURE 3) having a plurality of angularly spaced apart rotatable planet gears 35. Each of the planet gears 35 meshes with annulus gears 36, 37 which are respectively secured to the end faces 21, 22 of the rotatable portions 16, 17 respectively.

A ball bearing 40 has inner and outer races 41, 42 respectively which are respectively secured to the annulus gears 36, 37. Thus the ball bearing 40 permits relative rotation of the annulus gears 36, 37 while maintaining them in a predetermined axial relationship.

The planet carrier 34 is provided with a spindle 43 (FIGURE 4) on which is rotatably mounted a roller 44. The roller 44 is mounted in a track 45 of a track member 46 for rolling movement in said track, the track member 46 being secured effectively to the fixed portion 15. Accordingly, the planet carrier 34 is effectively connected to the fixed portion 15 so as to be prevented from rotating, the structure however permitting angular movement between the epicyclic gear device 33 and the fixed portion 15.

The rotatable portion 17 is rotatably mounted within a ring 50. The ring 50 has an arm 51 which is provided with a spindle 52 on which is rotatably mounted a roller 53. The roller 53 is mounted in a track 54 in the track member 46 which is effectievly secured to the fixed portion 15. The track 54 and roller 53 permit the arm 51 to move both axially and radially to accommodate differential expansion which may occur due to parts of the the jet pipe and associated apparatus being at different temperatures. At the same time, however, the construction is such that the ring 50 is connected to the fixed portion 15 so as to be restrained thereby from rotation.

The ring 50 is secured to a track member 55 having a track 56 in which is mounted a roller 57. The roller 57 is carried by a spindle 60 which is secured to a planet carrier 61 of an epicyclic gear device 62. The epicyclic gear device 62 has the same construction as the device 33 and will not therefore be described in detail.

It will thus be appreciated that the track member 55 is connected indirectly to the fixed portion 15 so as to be restrained thereby from rotating and thus restrains the planet carrier 61 from rotating.

Accordingly, when it is desired to move the rotatable portions 16 to 18 from the forward propulsion position shown in FIGURE 1 to the vertical lift position shown in FIGURE 2, the motor 31 is actuated to rotate the rotatable portion 16 through a predetermined angle. This causes rotation of the annulus gear 36 and thus effects rotation of the annulus gear 37 in the opposite angular sense. Rotation is thus effected of the rotatable portion 17 and similarly, by way of the epicyclic gear device 62, rotation is effected of the rotatable portion 18. Thus, these portions are moved so that their axes 23, 24, 27 are successively inclined by increasing angles to that of the fixed portion 15 so that the gases passing through the nozzle 20 may be downwardly directed.

We claim:

1. A jet pipe having a fixed portion and at least first and second rotatable portions which are mounted successively downstream of each other, each rotatable portion having inlet and outlet end faces which are mutually inclined, annulus gears disposed around those end faces of rotatable portions which are adjacent an end face of another rotatable portion, a planet carrier for each pair of adjacent rotatable portions, planet gears mounted thereon and which mesh with the respective annulus gears, track and roller means which interconnect the fixed portion of the jet pipe, and the planet carrier of each said pair to prevent rotation of the latter, and means for effecting rotation of the most upstream rotatable portion, such rotation causing the various rotatable portions to be moved between a first position in which the axis of discharge of the most downstream rotatable portion is approximately aligned with that of the fixed portion and a second position in which the said axis is inclined by a substantial angle to that of the fixed portion.

2. A jet pipe as claimed in claim 1 wherein the rotatable portions have straight axes, the adjacent end faces of adjacent rotatable portions being inclined to the axes of the latter, the said axes being successively inclined by increasing angles to the axis of the fixed portion when the rotatable portions are in the said second position.

3. A jet pipe as claimed in claim 2 wherein the planet carrier of each said pair has at least one roller mounted thereon, and there is provided a track member having a track which receives said at least one roller and a connection between the fixed portion of the jet pipe and the track member, preventing rotation thereof.

4. A jet pipe as claimed in claim 3 comprising at least three rotatable portions which are mounted successivly downstream of each other, a ring which rotatably receives the second rotatable portion, a track member to which the ring is secured, and a roller carried by the planet carrier of the second and third rotatable portions and received by a track in the track member, the ring having a connection to the fixed portion of the jet pipe which restrains it from rotation.

5. A jet pipe as claimed in claim 4 comprising an arm mounted on the ring, a roller mounted on the arm, and a track member having a track which receives the roller, the track member being secured to the fixed portion of the jet pipe.

6. A jet pipe as claimed in claim 5 in which the said track in the last-mentioned track member permits radial and axial movement of the said arm.

7. A jet pipe as claimed in claim 5, further comprising another track, in the last-mentioned track member, a roller mounted upon the planet carrier of the first and second rotatable portions, and engaging the said another track.

8. A jet engine provided with a jet pipe as claimed in claim 1.

References Cited

UNITED STATES PATENTS

| | | | |
|---|---|---|---|
| 2,788,803 | 4/1957 | Greene | 138—37 |
| 2,809,491 | 10/1957 | Wosika | 138—37 |
| 2,925,830 | 2/1960 | Kantrowitz | 138—37 |

PATRICK D. LAWSON, *Primary Examiner.*